UNITED STATES PATENT OFFICE.

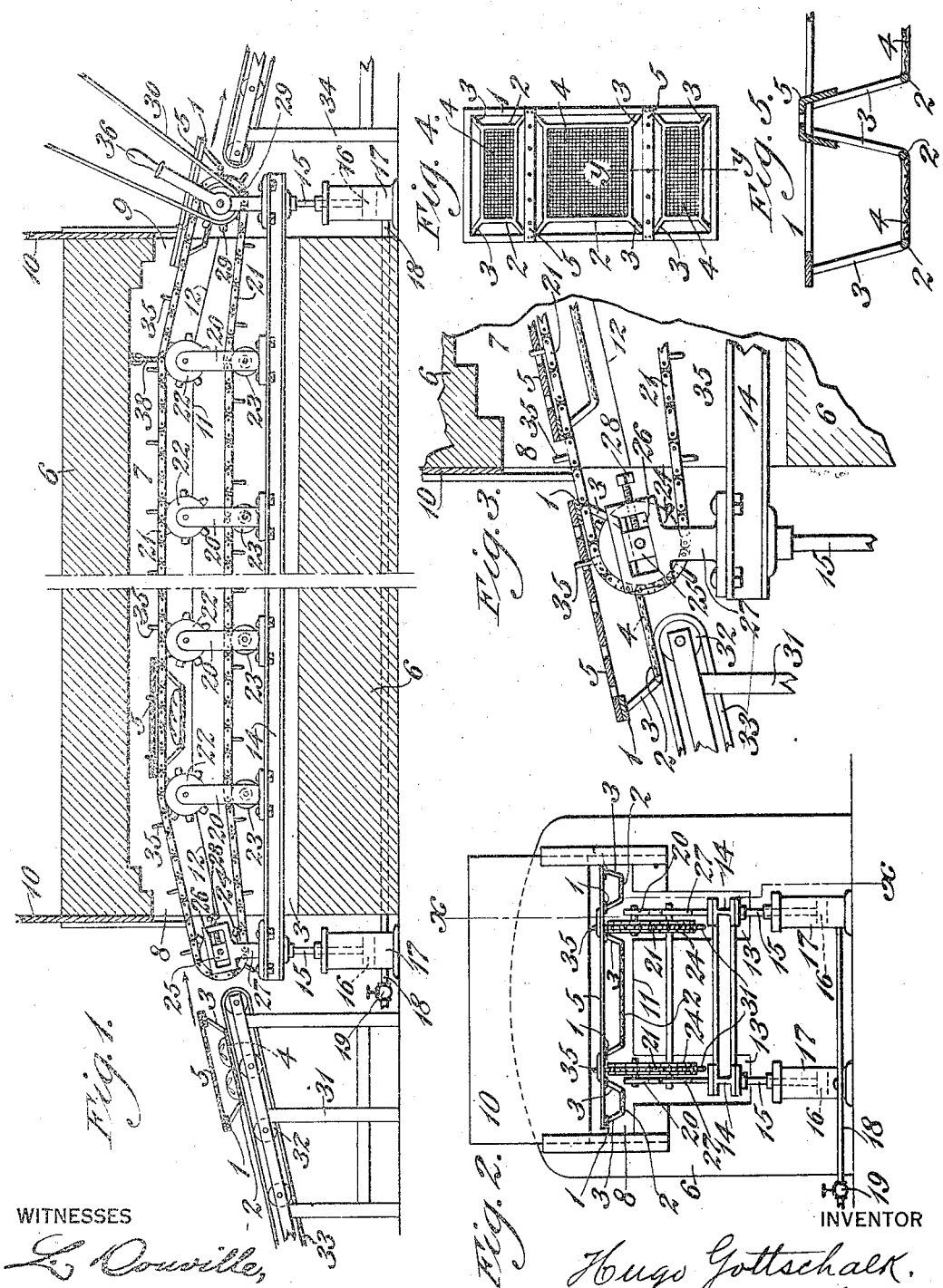

HUGO GOTTSCHALK, OF BURNHAM, PENNSYLVANIA, ASSIGNOR TO GOTTSCHALK AUTOMATIC BRICK OVEN COMPANY, INC., OF NEW YORK, N. Y., A CORPORATION OF NEW YORK.

DOUGH-CONTAINER FOR BAKING HEARTH-BREAD IN AUTOMATIC OVENS.

1,151,355.   Specification of Letters Patent.   Patented Aug. 24, 1915.

Application filed January 14, 1915. Serial No. 2,132.

*To all whom it may concern:*

Be it known that I, HUGO GOTTSCHALK, a citizen of the United States, residing at Burnham, in the county of Mifflin, State of Pennsylvania, have invented a new and useful Dough-Container for Baking Hearth-Bread in Automatic Ovens, of which the following is a specification.

My invention relates to a new and useful dough container for baking bread in an automatic oven and consists of a foraminous support for the bread, by means of which, when the loaf is carried into the oven substantially the entire outer surface thereof will be subjected to the same heat and vapor conditions in the oven, and when the support is deposited directly upon the hearth, the bottom of the loaf will be substantially in contact with the hearth.

It further consists of other novel features of construction, all as will be hereinafter set forth.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical section on line $x$—$x$ Fig. 2 of an automatic oven, showing my novel container in operative position. Fig. 2 represents an end elevation of the same. Fig. 3 represents an enlarged detail of the receiving end of the oven. Fig. 4 represents a top plan view of a container embodying my invention. Fig. 5 represents a sectional view on line $y$—$y$ Fig. 4, on an enlarged scale.

Similar numerals of reference indicate corresponding parts in the figures.

Referring to the drawings:—It will be understood that the dough container is more particularly adapted for baking so-called hearth bread, and is to be used in connection with an automatic oven of any suitable construction, wherein the containers or supports are carried into the oven, deposited upon the hearth, during the baking operation, and are then removed therefrom, and the support is adapted for baking bread of any kind, whether in loaves or rolls, and it will be understood that by the use of the term "loaf" herein, I mean to include all forms.

The container comprises a foraminous support for loaves with means for supporting the same upon conveyers and as preferably formed consists of upper frames 1 and lower frames 2, which are connected with the upper frames by the rods 3. Carried by each of the lower frames 2 is a foraminous supporting means 4, which forms the support proper for the bread or loaves, and which is formed of any suitable material, such as netting, wire mesh, or other porous material. The foraminous supports may be connected with their respective frames in any suitable or desired manner. Above the supports 4, here shown as connecting the frames 1, are bars or straps 5, which are thus positioned at a suitable distance above the supports 4, and which latter are spaced apart to provide sufficient clearance for the passage of the chain conveyers of the oven in order that the said straps or bars may rest on the chains, whereby the containers may be carried into and through the oven. The bars are provided with means adapted for interlocking engagement with coacting means on the conveyer, and, as here shown, the bars are provided with suitably spaced openings for this purpose.

In the present instance, I have shown three foraminous supports spaced from each other and carried by the frames 1 suitably connected, the whole forming a unit in operation and use, but any number of supports may be employed and differently arranged as is desirable and advantageous.

In the support or container illustrated, I have shown the same as adapted for use in an automatic oven similar to that disclosed in an application filed by me on May 2nd, 1913, Patent No. 1,137,711, and as shown in the drawings herewith, although it will be understood that the container may be differently constructed and arranged.

In the oven illustrated, 6 designates the wall of the oven formed of any suitable material and which is provided with a longitudinally arranged oven chamber 7. This chamber 7 is preferably in communication with one end of a mixing room of a bakery while at the other end, it is in communication with the bread room, suitable openings 8 and 9 being provided for this purpose and controlled by suitable doors 10.

11 designates the oven floor or hearth, which is here shown as formed with an inclined way 12 at each end in order to confine and prevent the escape of heat when one or the other of the doors 10 are opened. Longitudinally disposed of the hearth 11 is a pair of channels 13 which extend a suitable distance below the floor of the oven to receive the supports or beams 14 for a conveyer mechanism, which will be hereinafter described.

In my preferred construction, there is one beam 14 located in each channel 13 and preferably projecting therefrom at each end in order to seat upon a movable support independently of walls 6.

As here shown, the ends of the respective beams 14 are carried by a piston rod 15 having its piston or plunger 16 slidingly mounted within a fixed cylinder 17. The cylinders 17 are connected to and have communication at or near the bottom with a pressure fluid line or pipe 18, control of which is had by means of the valve 19. This valve 19 is preferably of the three-way type to exhaust the line at certain times and is located adjacent the inlet opening 8 or feeding end of the oven and in a position convenient for ready operation. When the valve 19 is open pressure fluid from a suitable source is simultaneously admitted beneath all of the pistons 16 consequently moving the rods 15 and thereby raising the beams 14, so that the conveyer mechanism may be brought above the floor of the oven.

20 designates suitable posts or standards secured to each beam 14 at certain intervals and preferably of such lengths as to cause the conveyer 21, here shown as chains, to closely follow the contour of the hearth or oven floor. It will be noted that each standard 20 serves as a journal support for the sprockets 22 which carry the conveyer chains 21 and prevent sagging intermediate the ends thereof. Each standard 20 is also provided with an idler 23 for the return portion of the conveyer while the tension of the said conveyer is maintained by providing an adjustable sprocket 24 for each of the chains, the said sprockets 24 being journaled in blocks 25 mounted in the slots 26 of the standards 27. A stud 28 or the like is threaded into each standard and bears against the respective blocks 25 so that the proper tension is always maintained in both conveyer chains.

29 designates the driving sprocket which receives power from the belt 30 or equivalent means.

31 designates a feed table positioned adjacent the inlet opening 8 and preferably having its supporting surface formed by transversely disposed rolls 32, the spindle or axes of which lie in an inclined plane substantially in alinement with the inclined hearth or oven surface 12, and around said rollers is a belt 33 for carrying the containers. A second table of similar construction is located adjacent the discharge end of the oven as shown at 34.

As will be understood, the containers or supports for the loaves are suitably spaced apart to provide for sufficient clearance between adjacent supports to pass the conveyer chains 21 and to allow the bars 5 to rest upon the said chains with the openings of said bars in engagement with the projecting means 35 of the chains in order that there will be an interlocking engagement of the chains with each container or plurality of supports, by reason of which the containers are positively held in line and in proper position to be directed through the oven without fear of being displaced upon the conveyers to catch or jam in the oven, and in addition, as the containers are released from the discharge end of the conveyers and directed upon a discharge table or other support, each succeeding container acts as a means to push the preceding containers from their position adjacent the said discharge end of the containers.

36 designates a belt shift for bringing the conveyer to rest at certain predetermined times, as will later be explained. It will, of course, be understood that any desired heating means for the oven may be employed as this forms no part of my invention.

The operation of the oven is as follows:— The conveyer mechanism is first started by shifting the belt 30 or like driving means. The filled supports are then placed upon the table 31 and pushed into engaging relation with the conveyer chains, it being noted that the inclination is such as to correctly position the supports relative to the conveyer. As fast as one set of supports is carried forward into the oven, another set follows until the capacity of the oven is reached. When this occurs, the operator shifts the driving means to bring the conveyer to rest, in which position the supports are suspended above the hearth or oven floor and not in contact therewith. During the foregoing operation, pressure fluid is acting on the pistons 16, thus holding the conveyer mechanism in raised position. The operator now cuts off the supply of pressure fluid and allows the cylinders 17 to exhaust gradually through the valve 19, whereupon the conveyer mechanism is gently lowered by gravity until the supports rest directly upon the oven floor. This position makes possible the baking of the dough in the correct manner since the heat acts first on the bottom of the loaf and works upward through the dough as it should for the best results. When this baking is completed, pressure fluid is again admitted to the cylinders 17 to remove the supports from contact relation with the oven floor, the conveyer is again started and as one set of supports is removed at the discharge end, another set containing fresh dough is fed in at the receiving end. In this manner, the supports are continuously fed into the oven, baked and removed therefrom while the mixing room is maintained separate and distinct from the bread room, thus avoiding confusion and eliminating a large number of skilled employees.

In order to prevent as far as possible a draft through the oven when being charged, I preferably provide a suspended baffle 38 of asbestos or like material adjacent the discharge end of the oven and which forms substantially a partition between the main oven portion and the exit end. By this construction a large amount of heat and heated vapor, otherwise wasted, is saved.

It will now be apparent that I have devised a complete unitary structure particularly adapted for the purpose intended and embodying a simple and effective construction to the desired end.

By forming the support or bottom of the container of relatively very thin material, which is foraminous or porous, it will provide that when the support is deposited upon the hearth, substantially the entire bottom of the loaf will be subjected to the direct heat of the hearth, by means of which I am enabled to produce the so-called hearth goods. Heretofore, in the manufacture of the so-called hearth goods, it has been customary to place the loaves on cloth or in boxes and thereafter place them upon a peel, by which means they are inserted into an oven. By the use of the present container, as soon as the loaf is made up or formed, it can be placed directly upon the foraminous support and not removed therefrom until the baking is completed. Extra handling of the loaves is thus avoided and it further insures that the loaves will be held in proper position without fear of striking each other, thus avoiding the formation of so-called "cripples" which arise in many instances, where the peel is employed, by the loaf sticking thereto or by one loaf being shoved against another. Another advantage derived from the use of the foraminous support is that substantially the entire outer surface of the loaf will be simultaneously subjected to substantially the same vapor and heat conditions when inserted in the oven, which is impossible when the ordinary methods are employed.

It will be further understood that by providing a skeleton frame for the supports, the heat and vapor can evenly circulate around the loaf, to subject the entire outer surface thereof to the proper baking action, but it will be understood that any suitable construction may be employed to accomplish this result and which will suitably carry the supports.

It will now be apparent that I have devised a novel and useful dough container for baking hearth bread in automatic ovens, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A bread baking oven having conveying means operating therein in combination with a loaf carrier comprising a foraminous support, a frame carrying the same, a frame above said support and spaced therefrom, rigid connections extending between the frames providing substantially unobstructed sides for the foraminous support, and means for removably supporting the upper frame upon the conveying means.

2. A bread baking oven having conveying means operating therein in combination with a loaf carrier comprising a foraminous support, a frame carrying the same, a frame above said support and spaced therefrom, rigid connections extending between the frames providing substantially unobstructed sides for the foraminous support, and means carried by the upper frame to rest upon the conveying means and extending longitudinally of the direction of travel of the support when on the conveying means.

3. A bread baking oven having conveying means operating therein in combination with a loaf carrier comprising a superframe, a lower frame, supporting rods connecting the frames, a foraminous support on the lower frame, and means for removably supporting the superframe upon the conveying means.

4. A bread baking oven having conveying means operating therein, in combination with a loaf carrier, comprising a superframe, a plurality of spaced lower frames, rods connecting the lower frames with the superframe, a foraminous support for the lower frames, and means carried by the upper frame in suitable location with respect to the spaces between the lower frames for removably supporting the superframe upon the conveying means.

5. A bread baking oven having conveying means operating therein in combination with a loaf carrier comprising a superframe, a lower frame, a foraminous support on the lower frame, and bars extending across the superframe to rest upon the conveying means.

6. A bread baking oven having conveying means operating therein provided with engaging means, in combination with a loaf carrier comprising a superframe, a lower frame, rods connecting the frames, a foraminous support on the lower frame, and bars extending across the superframe and provided with engaging means to coact with the engaging means of the conveying means.

7. A bread baking oven having conveying means operating therein in combination with a loaf carrier, comprising in combination a plurality of spaced foraminous supports, a frame above the supports and spaced therefrom, rigid connections for supporting the supports upon the frame, and means carried by the frame to rest upon a conveyer and located above the spaces between the supports and extending longitudinally of the direction of travel of the carrier.

8. A loaf carrier for baking bread in an automatic oven comprising in combination, a foraminous support, a frame carrying the same, a frame above said support and spaced therefrom, rigid connections extending between the frames providing substantially unobstructed sides for the foraminous support, and means for removably supporting the upper frame upon a conveyer.

9. A loaf carrier for baking bread in an automatic oven comprising in combination, a foraminous support, a frame carrying the same, a frame above said support and spaced therefrom, rigid connections extending between the frames providing substantially unobstructed sides for the foraminous support, and means carried by the upper frame to rest upon a conveyer and extending longitudinally of the direction of travel of the support when on the conveyer.

10. A loaf carrier for baking bread in an automatic oven comprising in combination, a plurality of spaced foraminous supports, a frame above the supports and spaced therefrom, rigid connections for supporting the supports upon the frame, and means carried by the frame to rest upon a conveyer an located above the spaces between the supports and extending longitudinally of the direction of travel of the carrier.

HUGO GOTTSCHALK.

Witnesses:
C. D. McVay,
K. M. Brophy.